United States Patent [19]

Roth

[11] Patent Number: 4,461,378
[45] Date of Patent: Jul. 24, 1984

[54] SIDE DISCHARGE CONVEYOR ASSEMBLY

[75] Inventor: Francis A. Roth, Lakewood, Colo.

[73] Assignee: Robert L. Alldredge, Denver, Colo.

[21] Appl. No.: 285,066

[22] Filed: Jul. 20, 1981

[51] Int. Cl.³ .............................................. B65G 47/46
[52] U.S. Cl. .................................... 198/365; 198/822; 198/839
[58] Field of Search ............... 198/365, 369, 631, 715, 198/713, 839, 802, 820, 821, 822, 706, 364

[56] References Cited

U.S. PATENT DOCUMENTS

| 97,070 | 11/1809 | Gardiner | 198/364 |
|---|---|---|---|
| 2,818,962 | 1/1958 | Hörth | 198/839 X |
| 3,386,563 | 6/1968 | Harrison | 198/802 X |

FOREIGN PATENT DOCUMENTS 1182570  9/1957  France .............................. 198/365

Primary Examiner—Joseph E. Valenza
Assistant Examiner—Dennis J. Williamson
Attorney, Agent, or Firm—Kyle W. Rost

[57] ABSTRACT

A conveyor assembly follows a pathway defined by a supporting framework, wherein the pathway may include serpentine portions. The framework supports a transport mechanism for movement along the pathway, and a belt assembly is carried by the transport mechanism. The belt assembly includes a continuous belt having flexible convolutions permitting the belt to follow serpentine portions of the pathway and also permitting the belt to locally laterally tilt for side discharge without requiring the transport mechanism to similarly tilt. A pivotal member between the transport mechanism and belt assembly permits the belt to tilt laterally, such as on a hinge point laterally offset from the center of the conveyor pathway. An actuator causes a selected portion of the belt to tilt on the hinge point. A suitable actuator includes a camming member located on the opposite lateral side of the supporting framework from the hinge point, and the belt assembly may include a tiltable arm extending over the camming member for interacting contact. The camming member may be longitudinally movable for varying the longitudinal position of discharge and also be vertically movable for varying the degree of tilt imparted to the arm and, in turn, to the belt assembly. The inverted return run is provided with a retaining rail to prevent the belt assembly from tilting under force of gravity.

5 Claims, 4 Drawing Figures

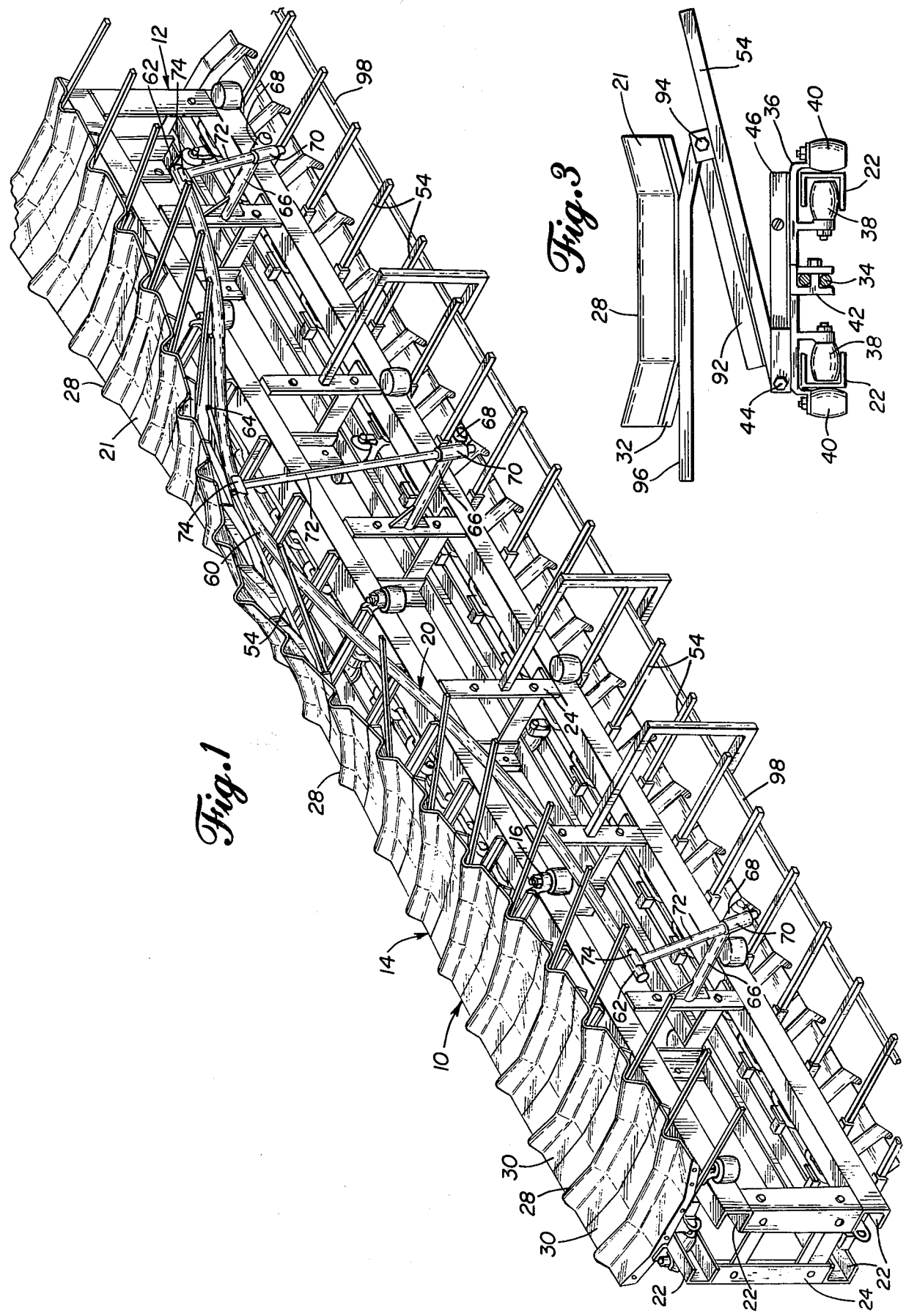

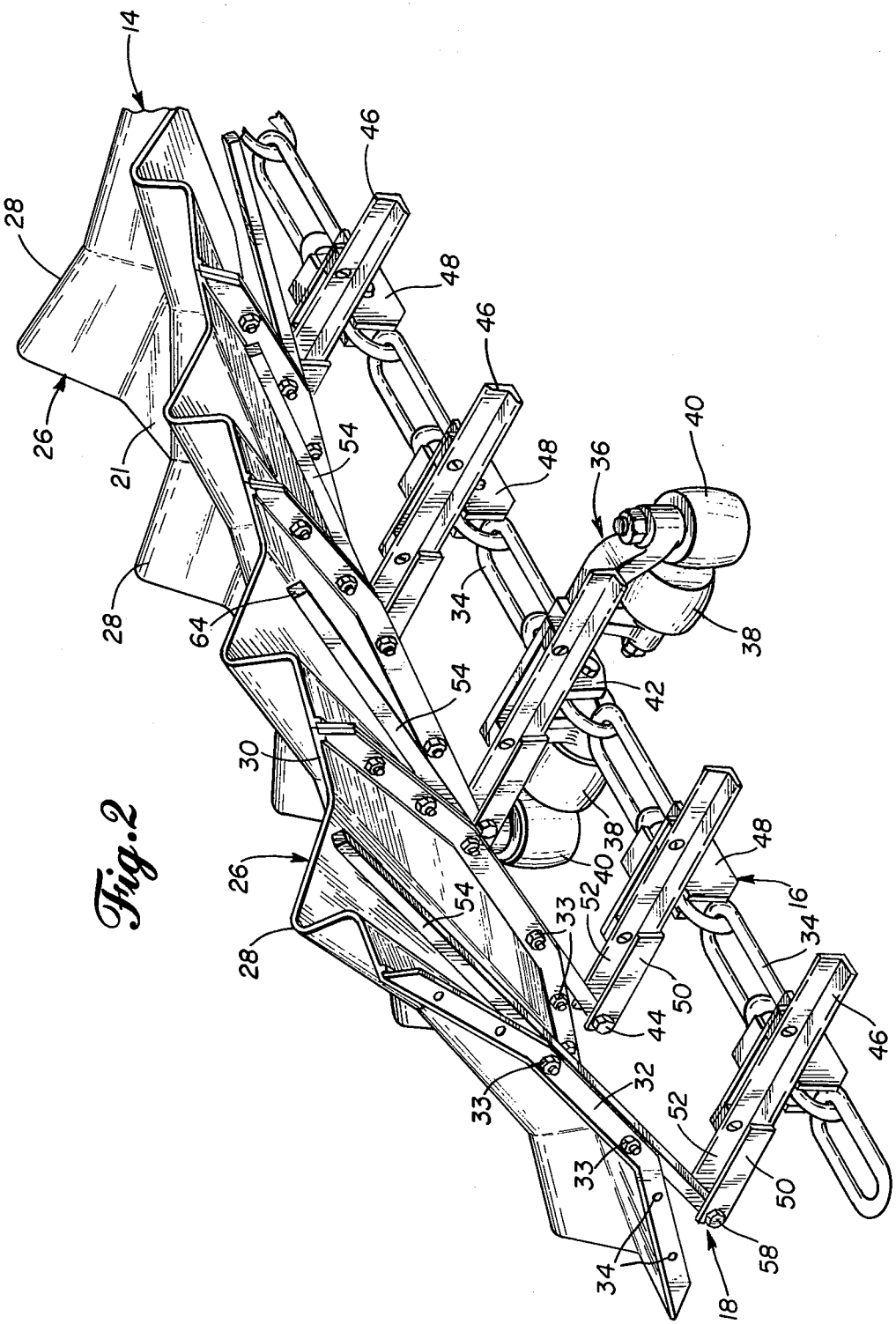

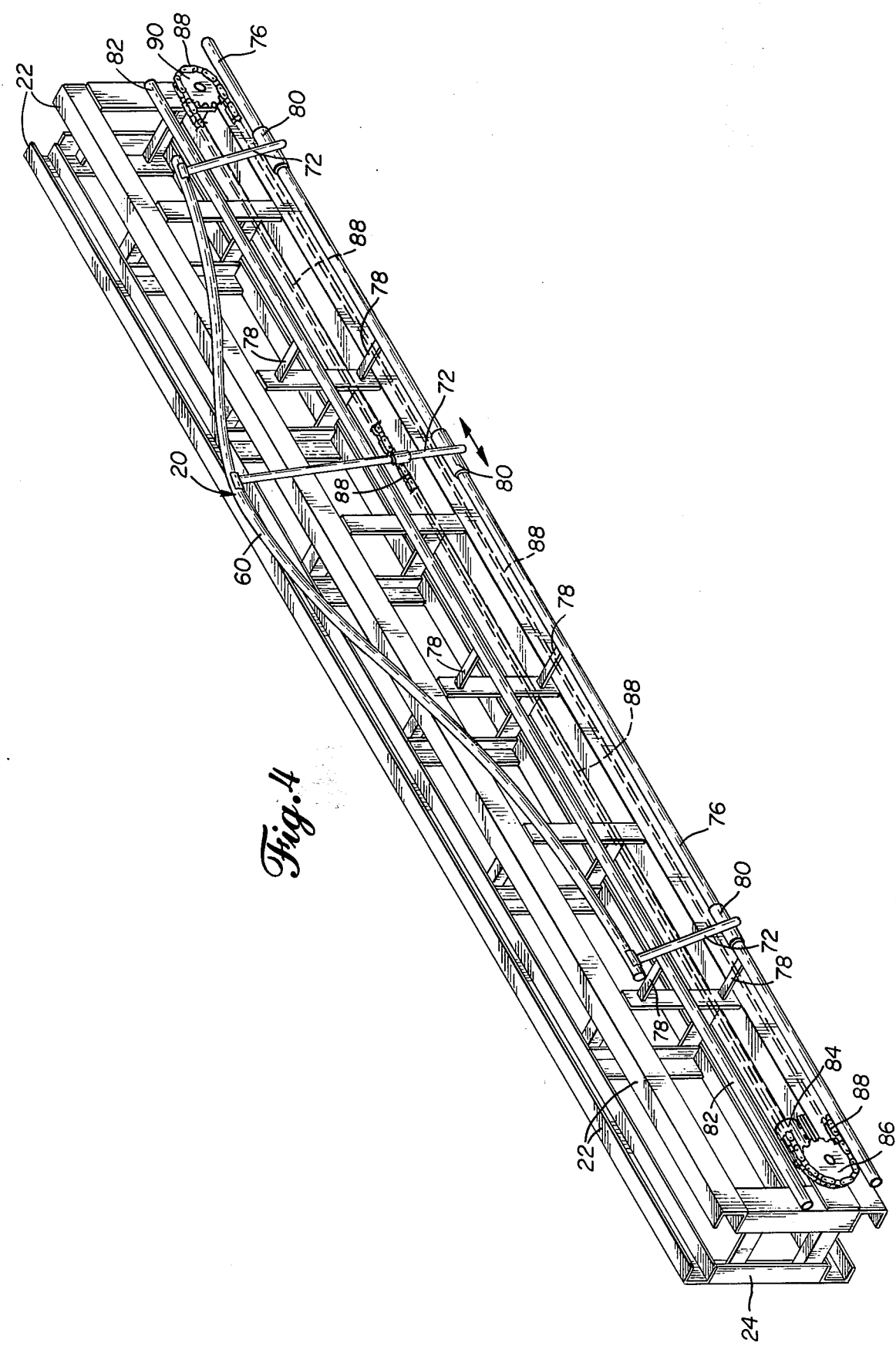

SIDE DISCHARGE CONVEYOR ASSEMBLY

BACKGROUND OF THE INVENTION

1. Field of the Invention

The invention relates to power driven conveyors and more specifically to belt conveyors wherein the belt is capable of following a curved or helical path. A side discharge station is disclosed that may be variably employed along the length of the conveyor.

2. Description of the Prior Art

With the development of conveyor belt sections able to flex resiliently for bending in two planes, it became possible to discharge a carried load from such a conveyor belt by designing its supporting structure to tilt the belt laterally and thereby dump the carried load at a fixed point at the side of the belt, rather than at the end of the belt as had been previously the common practice. A conveyor belt having the noted ability to follow vertical, horizontal, and helical curves in its path is taught in U.S. Pat. No. 2,701,050 to Steinborn. Conveyors employing this patent for many years supported the belt on a roller carriage having rollers at the lateral sides of the belt, and the rollers followed a pair of parallel channel shaped tracks near the lateral sides of the belt, which tracks defined a fixed path having the desired curves fixed therein. The location of the side discharge was therefore fixed by the rail configuration and operated continuously as the belt passed the station.

The usefulness and flexibility of side discharge stations was greatly improved with the invention of U.S. Pat. No. 3,169,631 to Knappe, which contributed the concept of a flexible rail section constructed from a plurality of rail segments. It then became possible to intermittently employ side discharge stations along the length of a conveyor, allowing a single conveyor to serve at random a plurality of discharge locations and to selectively discharge the conveyed material at the end of the conveyor at a last discharge station.

The concept of the articulated rail was further developed to permit the inclusion of flexible track assemblies in the total length of a conveyor, whereby the user could adjust the track along the desired path without having to custom bend solid rail. This line of development is taught in U.S. Pat. No. 3,707,218 to Payne and U.S. Pat. No. 4,144,965 to Alldredge. The options for side discharge remained, however, much as it had been before, with the rail itself defining the discharge station, whether the rail was preformed solid rail or flexible articulated rail.

While the flexible rail discharge station offered a distinct advantage over the solid rail, this structure also had disadvantages. The construction of articulated rail sections required a great deal of labor, heavy duty materials, and consequent high cost. In addition, the roller carriages that travel on the rail are connected by link chain, which endures twisting and wear when helically bent at a curve or discharge station. Consequently, alternatives to the side discharge station employing articulated track segments have been sought.

The present invention provides a solution to each of the above noted problems while providing benefits not previously achieved in the art.

SUMMARY OF THE INVENTION

A power driven conveyor assembly having side discharge capability includes a supporting framework that defines a generally longitudinal pathway for conveyor operation. A conveyor belt is adapted to follow the generally longitudinal pathway defined by the framework and is provided with a top surface adapted to carry a load maintained on the top surface by gravity, and the belt is laterally tiltable to at least one side of the longitudinal pathway for side discharge of the load by gravity. A transport means is carried by the support framework for relative motion along the longitudinal pathway under power of a suitable drive mechanism and is joined to the conveyor belt for imparting motion to the belt relative to the supporting framework along the longitudinal pathway. The joining means between the transport means and the belt permits the belt to tilt laterally with respect to the transport means for side discharge of the carried load without substantially tilting the transport means from the longitudinal pathway. A means for tilting the conveyor belt at the desired location along the longitudinal pathway causes the side discharge to take place.

The joining means may include a hinge having a longitudinal pivot axis and offset from the conveyor center line to approximately the edge of the belt. One side of the hinge is attached to the transport means, while the opposite side of the hinge may include an elongated arm attached to the belt and extending transverse to the belt beyond the belt edge opposite from the hinge, providing a lever that may be acted upon by the tilting means to tilt the belt. A suitable tilting means includes an arc shaped guide rail positioned to be struck by the elongated arm and to guide the arm upwardly along the path defined by the rail, in turn causing the belt to tilt on the hinge and discharge its load.

The tilting means may be connected to or associated with the support framework in such a way that it is movable into or out of the path of the elongated arms for selectively actuating side discharge. Further, the tilting means may be movable along the longitudinal pathway for varying the position at which side discharge will occur.

The main object of the invention is to provide for the side discharge of a conveyed load wherein the mechanism supporting the conveyor surface for movement over an underlying support surface is not required itself to tilt during the discharge process, thereby reducing an important source of wear on the supporting mechanism.

An important object to to provide a side discharge station wherein the conveyor forces remain directed through a supporting structure adapted to bear such load. In a roller carriage supported conveyor belt, the carriage is thus maintained substantially in its normal running position against the supporting framework with the rollers bearing the weight of the belt and load as intended in the conveyor design. The discharge is accomplished by a shift of the load with respect to the carriage, for example by movement of the belt and its load, rather than by a shift in the position of the carriage itself.

Another object is to provide for the potential to discharge the load from variable locations along the operational run of the conveyor. This is achieved by providing a means intermediate the conveyor belt and its carriage for tilting the belt without regard to the tilt of the carriage, thereby eliminating the need for local, special purpose structures in the supporting framework. For example, the need for a flexible rail in the carriage support structure is eliminated for purposes of side discharge, as the flexible belt itself provides the ability to tilt under the direct influence of a tilt actuator. The side discharge ability then exists along the entire length of the operational belt run.

A further object is to provide the ability to continuously move the location of a side discharge station during continuous conveyor operation. This is achieved through provision for a tilt actuating mechanism able to move its operating station upon demand.

Still another object is to permit side discharge from either side of a conveyor, allowing latitude in the access to the load being discharged.

BRIEF DESCRIPTION OF THE DRAWINGS

FIG. 1 is an isometric view of the conveyor assembly having a side discharge station in operation.

FIG. 2 is an enlarged fragmentary view of the belt assembly and transport means, showing details of construction.

FIG. 3 is a transverse cross-section of an embodiment of the conveyor assembly adapted to tilt to either side, shown in an expanded position for clarity.

FIG. 4 is an isometric view of the conveyor supporting framework and tilt actuating means in an embodiment permitting continuous movement of the actuating means.

DESCRIPTION OF THE PREFERRED EMBODIMENT

As best shown in FIG. 1, the conveyor assembly 10 is in the form of a longitudinal pathway defined by a supporting framework 12 that carries a conveyor belt assembly 14 for movement along the pathway. A transport means 16 is connected to the support framework for relative longitudinal motion with respect thereto. The belt assembly 14 is joined to the transport means in such a way that movement of the transport means imparts movement to the belt assembly relative to the supporting framework. Joining means 18, FIG. 2, connects the belt assembly and transport means while permitting the belt assembly to laterally tilt with respect to the transport means. A tilt actuator means 20 causes the belt assembly to tilt with respect to the transport means at a preselected location along the conveyor path.

The supporting framework 12 and conveyor belt 21 may be of the known type wherein the belt is capable of following a serpentine pathway defined by the framework. Specifically, the framework may define an operational or upper run in which the belt is usually positioned to carry a load by gravity, and a lower or return run in which the belt is supported in non-operative position. Each run is defined by a pair of channel shaped rails 22 having the open face of the channel facing the opposite rail of the run. Thus, the top two rails 22 of FIG. 1 may define the upper run, and the bottom two rails 22 define the lower run. Braces 24 maintain the rails of each run at the desired spacing and, optionally, maintain the upper and lower runs at a fixed spacing. Alternatives to the presence of a lower run include a continuous belt 21 operating in a closed path substantially on one level or belt sections that shuttle back-and-forth on a single run. The channel shaped rails define the longitudinal path of the conveyor assembly and may include curves and spirals.

Conveyor belt 21, best shown in FIGS. 1 and 2, is capable of following a curved path and carries its load by gravity in a series of belt pans defined by joined belt sections 26, each having a central, transverse convolution 28 formed from flexible material such as rubber. A shelf 30 extends from the front and rear of each convolution and is vulcanized to a metal angle shaped stiffener having its side portions turned up at an acute angle such as twenty degrees from the central, flat section, thereby forming a troughed flat section of each pan at the center of each stiffener. The belt is vulcanized to a wider leg of the stiffener that runs parallel to shelf 30. A narrower leg 32 of the stiffener runs perpendicular to the belt surface and transverse to the direction of belt travel. Leg 32 is provided with holes 34 that permit the legs 32 of adjacent belt sections to be fastened together, such as with bolts 33, and to be fastened to related hardware of the belt assembly that may be useful in connecting the belt assembly to the joining means 18. It is thus possible to assemble a belt assembly of any desired length by combining belt sections 26. The belt so formed may at the same time be attached to other portions of the conveyor assembly so as to be moved by the transport means. When belt sections are joined together and each joint attached to the moving portion of the conveyor assembly, a continuous troughed belt made up of individual sections with central convolution capable of flexing has been constructed.

The transport means 16 may include a tension member such a conveyor chain 34 engageable with a drive sprocket, which is well known as a means to advance a conveyor drive chain. Another portion of the transport means may be carriage 36 carrying rotatable rollers 38 and 40. Rollers 38 are carried on horizontal axes and operate inside rail channels 22 to maintain the vertical position of the transport means with respect to the supporting framework. Rollers 40 are carried on vertical axes and operate against the outside of the channel to cause the transport means to follow the supporting framework through horizontal curves. Together, the rollers 38 and 40 cause the carriage 36 to follow the rail channels through curves in both horizontal and vertical directions. The carriages 36 are attached to the chain 34 by fasteners 42.

In the past, it has been proposed that a conveyor belt 21 be directly and firmly attached to a carriage 36 and that the rail channel in the upper run be configured to cause the carriage and belt to tip for side discharge. In contrast to the prior system, a tiltable joining means 18 is employed between the belt 21 and transport means 16 so that the carriage and chain are not subjected to twisting motion when the belt laterally discharges. The preferred tiltable joining means includes a hinge 44 or other pivot member between the belt and the transport means. The belt is then capable of tilting at least to one lateral side of the conveyor assembly on pivotal hinge 44 without requiring the transport means to similarly tilt. Hinge 44 may be formed as a portion of a large hinge structure defined by portions of both the transport means and belt assembly. Base bracket 46, which is transverse to the conveyor pathway, may form a part of the hinge structure associated with the transport means. FIG. 2 shows two types of attachment between the base bracket and the transport means. One attachment is directly to a roller carriage 36 and would be employed at whatever interval the carriages are employed, which may or may not be at each junction of two belt sections. The second attachment is to chain fasteners 48, which are carriages not having rollers 38 and 40. The latter carriages are employed between roller carriages 36 if at all. The base bracket 46 includes a channel shaped end portion defined by spaced apart walls 50 and 52, which both define a portion of the hinge 44 and support other parts of the hinge structure between the walls. The channel shaped end of the bracket is preferred to be offset laterally from the center line of the transport means in order to locate the hinge axis near one lateral side of the conveyor pathway. The opposite end of the bracket 46 may be an open angle having a single upstanding wall 52, permitting the fasteners attaching the hinge structure to the belt assembly to avoid interference with the bracket.

Another portion of the hinge structure may include a tiltable arm 54 forming part of the belt assembly. The arm may be directly attached to the belt by bolts 33 passing through the arm and through the holes in belt stiffener leg 32 at the junction of two belt sections. One end of the arm fits between bracket walls 50 and 52 at the hinge and defines a further portion of the hinge. A hinge pin 58 may pass through suitable holes in walls 50 and 52 and arm 54 to define the pivot axis of the hinge lying substantially parallel to the longitudinal conveyor pathway.

The conveyor belt 21, pulling chain 34 and rails 22 are substantially symmetrical in transverse cross-section, each having a longitudinal center line in substantially the same vertical longitudinal plane. The hinge point will ordinarily not be in the plane of the center lines, but will be offset to a lateral side, for example to approximately the edge of the belt so that when the belt tilts to discharge a load to the side, the load will be clear of the entire conveyor assembly. The base bracket 46 may therefore have approximately the same width as belt 21 and have hinge point 44 close to one end of the bracket. The bracket is then approximately as wide as the supporting framework and the transport means, although it is not necessary that the bracket be fully as wide as the widest part of the transport means, such as the rollers 40 at the lateral ends of the carriages 36, since the upwardly angled sides of the belt pans serve as a chute during side discharge to direct the load away from the side of the conveyor assembly.

Tilt actuator means 20 causes the belt to tilt for side discharge by acting on the belt assembly 14. FIG. 1 shows the tilt actuator means to include a smoothly curved camming rail 60 supported on the side of the conveyor assembly opposite from the hinge point 44. The rail 60 has opposite ends 62 that are below the level at which contact is made with the belt assembly 14, and the center of the rail 60 is curved upwardly from the ends 62 in a smooth arc. Contact with the belt assembly may be against elongated portions of arms 54 extending laterally beyond the side edge of the belt 21 on the side opposite from the hinge point. Arms 54 therefore act as levers providing a mechanical advantage to the rail 60 in tilting the belt and its carried load. FIG. 1 shows rail 60 with its central raised arc sufficiently above the ordinary line of travel of arms 54 such that the arms are raised at their free ends 64 and forced to pivot on hinge point 44 as the arms come into contact with rail 60 and slide toward the peak of the arc. This camming action causes the conveyor belt 21 to assume a side tilted configuration, discharging its load when the degree of tilt is sufficient. The arms 54 continue to slide on rail 60 past the crest of the arc, returning to a substantially horizontal position and correspondingly returning the belt to a level position.

The position of the side discharge station may be selectively located by adjustment of the rail 60 position. FIG. 1 shows an embodiment wherein the rail 60 is attached to the conveyor assembly 10 at the supporting framework, such as to vertical braces 24. Attachment arms 66 extend laterally from braces 24 and are engaged in collars 68, which, in turn, are connected to collars 70 that receive support rods 72. Rail 60 is supported by rods 72, such as in saddle brackets 74. The side discharge station location may be initially selected by choosing the attachment arms to which the rail 60 will be mounted by collars 68. The location of discharge may be further selected by adjusting the height of the rail via the degree of insertion of rods 72 in collars 70. If desired, the rail may be lowered to an inoperative position when no side discharge is desired at a rail 60. The rail lies approximately in a single plane, which may include rods 72 and collars 70 as well. This plane is tilted from vertical toward the belt assembly so that the rail moves both upwardly and toward the belt assembly as it is raised, thus maintaining good contact with the arms 54 along the entire tilted length of belt assembly without requiring the arms 54 to be excessively long for contacting the rail at the peak of the arc.

Further adjustment of the side discharge position is made possible by the embodiment of FIG. 4, wherein the rail 60 is movable longitudinally to any desired position. Guide bar 76 is attached to the supporting framework by attachment arms 78 and provides a continuous track through whatever portion of the conveyor assembly 10 it is desired to discharge a load from the side of the belt. Sliding saddle rests 80 engage the guide bar and support rods 72 and rail 60 as previously described. A second guide bar 82, parallel to bar 76, is also attached to the supporting framework and is offset vertically and horizontally from bar 76 to support rods 72 and rail 60 at the desired angle to the conveyor path. Rail 60 may then be moved selectively along bars 76 and 82 to produce side discharge at either fixed or moving locations. Longitudinal movement of the rail may be controlled by a motor 84 attached to a drive means such as sprocket wheel 86 engaging roller chain 88, which is joined to rail 60, such as at central rod 72. The chain may further engage idler sprocket 90 at an opposite end of guide bar 76 from the motor. The rail may then be moved to any point between the sprockets 86 and 90 and may reciprocate between them by automatic reversal of the motor whenever an end point is reached. If desired, the embodiment of FIG. 4 may include means to raise and lower the rail, such as collars 70 shown in FIG. 1. Such collars may releasibly hold the rods 72 in the desired position by clamping, cross-pins, set screws or other mechanical fasteners, or the collars may be viewed instead as being hydraulic or pneumatic cylinders having rods 72 as the actuator rods of the cylinders, permitting the instantaneous and frequent vertical movement of rail 60 during continuous operation of the conveyor.

A modification of the conveyor assembly structure is shown in FIG. 3, wherein the belt is capable of side discharge to either or both sides. A carriage 36 as previously described is attached to the conveyor chain 34 for movement along the upper run of the conveyor, as defined by upper run rails 22. A base bracket 46 is mounted on carriage 36 and is provided with a first hinge point 44 offset to one side of the conveyor center line. Arm 54 is pivotally connected to first hinge point 44 and extends beyond the side of belt 21 opposite from hinge point 44 for contact with a rail 60 at the side dump station. Arm 54 is attached to a second base bracket 92 having a second hinge point 94 offset from the conveyor center line on the opposite lateral side from hinge point 44 by an equal distance. An arm 96 similar to arm 54 is pivotally connected to hinge point 94 and extends across the conveyor center line in the opposite direction to arm 54, extending beyond the side of the conveyor belt 21 on the opposite side from arm 54. The belt 21 is attached to arm 96 at the belt pan joint.

The arc shaped tilt mechanism may be employed to contact one or both arms 54 and 96. If a rail 60 is employed on both sides of the conveyor assembly, each tilt mechanism can be operated independently except that they should not be operated simultaneously while directly opposed. The use of one or two tilt mechanisms 60 mounted on rails as shown in FIG. 4 will permit the side dump location to be varied from fixed place to fixed place to form discrete peaked piles of discharged material, or the tilt mechanisms may be continuously moved along the conveyor path while dumping to form a winnow.

If the conveyor belt is oriented to have an upper and a lower run, various retaining means may be employed to prevent the belt from hanging in a tilted position while traveling along the lower run in inverted position. FIG. 1 shows a retaining rail 98 against which the tilt arms 54 can rest. This rail is held in place by brackets 100 attached to the braced 24. Other retaining means may include friction clips or gravity latches attached to the transport means.

Further embodiments of the conveyor assembly may provide anti-friction means on all sliding surfaces. For example, the rail 60 and rail 98 may be constructed from or include a wear strip of low friction material such as ultra-high molecular weight polyethylene, or arm ends 64 may be coated with this material at the contact point with such rails. Alternatively, bearings may be mounted on the tilt arms 54, 96 to reduce the friction against the rails.

In operation, the conveyor assembly may be viewed as being a section of a larger conveyor, wherein the section is served by a tilt mechanism, and the total conveyor belt is adapted to tilt in response to the action of the tilt mechanism. Alternatively, the conveyor assembly may be viewed as being an entire conveyor apparatus. In either situation, the supporting framework provides a relatively stationary base and typically would be non-tilting. The conveyor belt assembly and transport means are movable with respect to the framework and follow a longitudinal pathway defined by the framework. The transport means, however, is like the framework in that it is a non-tilting portion of the conveyor assembly. The belt assembly may be termed the only tilting portion of the conveyor. The joining means 18, which constitutes a hinge point or other tiltable connection, is the interface between the tilting and non-tilting conveyor portions. In the embodiment adapted to tilt to only one side, this interface is identified as a hinge area having hinge pin or bolt 58 as the pivot mechanism. In the embodiment adapted to tilt to either side, the joining means may alternately constitute hinge point 44 and hinge point 94, depending upon the direction of tilt. In all cases, however, part of the moving portion of the conveyor assembly is also non-tilting with respect to the tilting belt, whereby the tilting of such critical components as the chain is avoided. Therefore, by dividing the moving portions of the conveyor assembly into a substantially non-tiltable portion such as the transport means and a tiltable portions such as the belt assembly, an important cause of stress causing component wear and failure has been eliminated.

The above example has been provided with respect to the best embodiment of the invention as presently known. Certain modifications of the described structure might be readily made. Therefore, it should be understood that the scope of the invention is to be limited only by the following claims.

I claim:

1. An improved side discharge conveyor assembly capable of discharging its carried load in a wind row, wherein the conveyor assembly is of the known type having a support framework defining a generally longitudinal pathway for conveyor operation; a transport means carried by the support framework for relative motion along the longitudinal pathway defined by the support framework and including a plurality of carriages joined to a pulling chain; and a conveyor belt assembly carried by the transport means for motion therewith along the pathway defined by the support framework, the belt assembly being of the type forming an endless conveyor belt from a plurality of segments that are joined together to define the belt, each segment having a central transverse flexible convolution with a shelf extending longitudinally from each of the two opposite longitudinal faces of the convolution, each shelf being attached to a joining leg near the end edge of the shelf for uniting adjacent segments, wherein the improvement comprises:
   (a) a first hinge arm connected transversely to the longitudinal pathway of the belt assembly at a joining leg, a first portion of said first hinge arm extending laterally of the conveyor belt on a first side thereof for receiving tilting forces during side discharge operations, and a second portion of the first hinge arm extending laterally of the conveyor belt center line in opposition to said first portion thereof;
   (b) a hinged joining means connected to a carriage and receiving said second portion of the first hinge arm in pivotal connection supporting the belt assembly for local tilting by force applied to said first arm portion of the first hinge arm;
   (c) actuator means positionable in the longitudinal pathway of the first arm portion for inducing lateral local tilting of the belt assembly with respect to the transport means to side discharge, in use, at the local tilted portion of the belt assembly; and
   (d) means for longitudinally moving the actuator means with respect to the support framework to longitudinally vary the local position of side discharge on a continuous basis for permitting deposit, in use, of the discharged material in a wind row.

2. The conveyor assembly of claim 1, wherein said transport means is of the type having a pulling chain lying approximately in a vertical plane through the longitudinal center line of the conveyor pathway and further comprises a bracket having a channel shaped portion adapted to receive said first hinge arm, said bracket being joined to the joining means at a point laterally offset from the pulling chain.

3. The conveyor assembly of claim 1, wherein said support framework is of the type defining both an upper operational conveyor run and a lower, return conveyor run along the conveyor pathway, and wherein the belt assembly includes an endless belt carried in inverted, non-load carrying position along the lower run with respect to its position along the upper run, further comprising retaining means for preventing the belt assembly from tilting while traveling along the lower run, wherein the retaining means comprises a longitudinal rail contacting said first hinge arm extension on the first side of the belt.

4. The conveyor assembly of claim 1, wherein said actuator means comprises a camming member and a height adjusting means for permitting height variation of the camming member with respect to the supporting framework for varying the degree of tilt of the belt assembly during side discharge.

5. The conveyor assembly of claim 4, wherein said height adjusting means is offset toward a lateral side of said support framework and comprises means for moving the camming member acutely upwardly and laterally toward the conveyor pathway.

* * * * *